May 14, 1963
M. O. DE VOS
3,089,709
WHEELED TOY VEHICLES
Filed Dec. 27, 1961
2 Sheets-Sheet 2
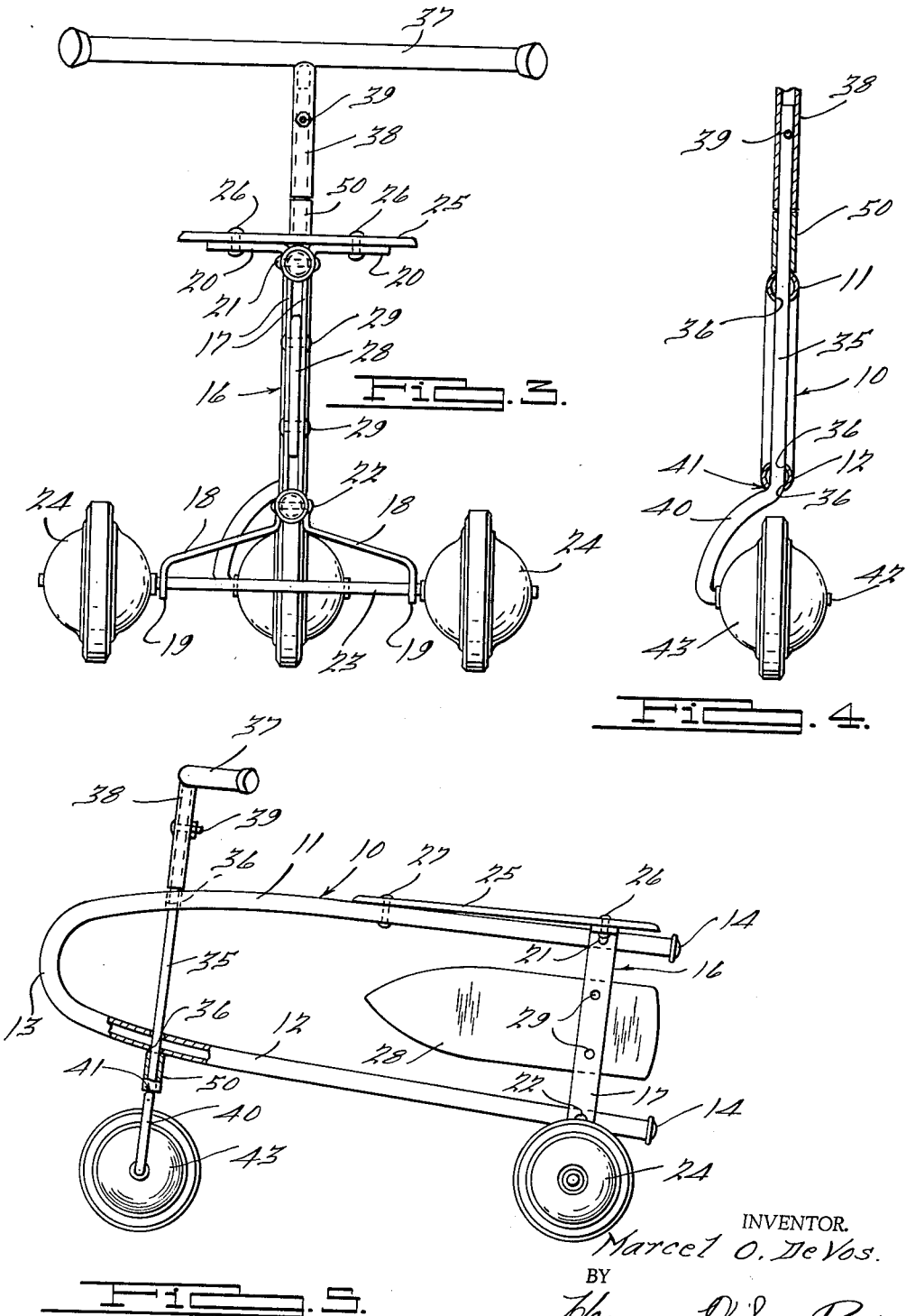
INVENTOR.
Marcel O. De Vos.
BY
Harness, Dickey & Pierce.
ATTORNEYS.

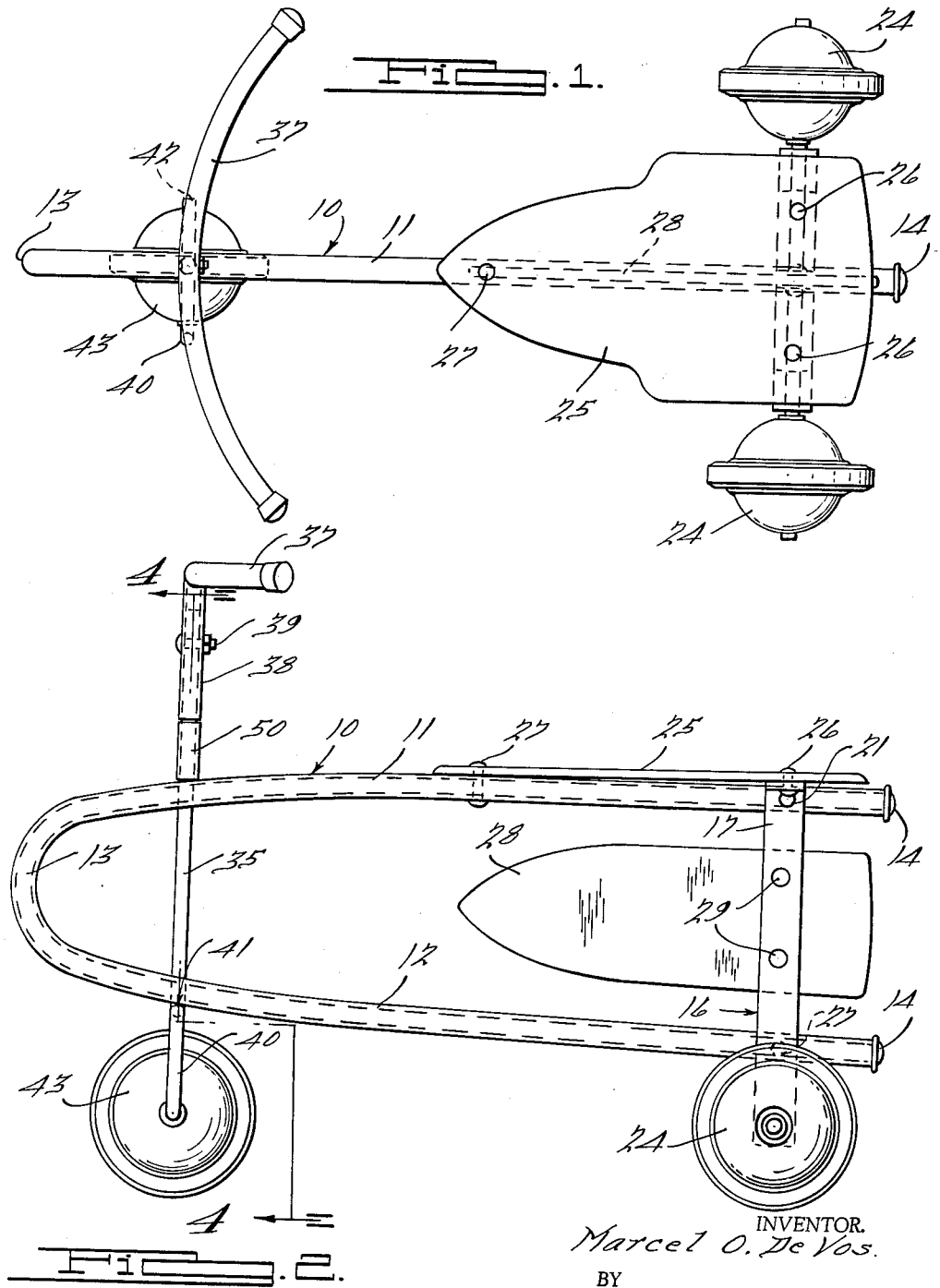

United States Patent Office 3,089,709
Patented May 14, 1963

3,089,709
WHEELED TOY VEHICLES
Marcel O. De Vos, Grosse Pointe Woods, Mich., assignor, by mesne assignments, to Grow-Rite Corporation, a corporation of New York
Filed Dec. 27, 1961, Ser. No. 162,467
3 Claims. (Cl. 280—87.05)

This invention relates to wheeled toy vehicles and more particularly to improvements in juvenile vehicles of this type adapted to simplify the construction thereof whereby the device may be economically manufactured from a minimum number of parts of simple design and which may be assembled with facility.

An important object of the invention is to provide a novel front end assembly designed to provide spaced supports for the steering rod or column by the simple expedient of passing the same through opposed return-bent portions of the vehicle body frame thereby providing an inexpensive but sturdy construction.

Another object of the invention is to provide a simple, inexpensive means for adjusting the seat height of the vehicle by means of a spacer-sleeve adapted for placement on the steering rod or column above or below the vehicle frame portion which supports the steering rod to vary the position of the frame member with respect to the steering rod and thereby vary the height of the seat.

Various other objects and advantages and the novel details of construction of one commercially practical embodiment of the invention will become more apparent as this description proceeds, especially when considered in connection with the accompanying drawings in which:

FIGURE 1 is a top plan view of a wheeled toy vehicle constructed in accordance with this invention, FIGURE 2 is a side elevational view of the device, FIGURE 3 is a rear elevational view, FIGURE 4 is a sectional elevational view taken substantially on the plane indicated by line 4—4 in FIGURE 2, and FIGURE 5 is a view similar to FIGURE 2 showing the seat in its raised position.

Referring now to the drawings, it will be noted that the vehicle comprises a main frame member 10 which is preferably formed of a continuous length of tubing bent to form a substantially U-shaped member providing an upper leg 11 and a lower leg 12; the bight of the U-shaped member forming a curved or bowed front portion 13. The rear ends of the legs 11 and 12 of the frame member 10 are closed by caps 14 which form smooth surfaces acting as bumpers to prevent the marring of furniture and walls. The curved front end 13 also acts as a bumper to minimize the marring of objects contacted by the vehicle.

The reference character 16 indicates the rear frame member and comprises a pair of complementary metal strips 17, each having an outwardly, angularly bent portion 18 terminating in an axle carrying lugs or ears 19. The upper ends of the frame members 17 are provided with laterally-extending seat-supporting portions 20.

The frame members 17 are bent to partially embrace the legs 11 and 12 of the main frame member 10 and are secured thereto as by means of rivets 21 and 22. An axle 23 is mounted in the ears or lugs 19 and wheels 24 are rotatably mounted on the axle 23.

A seat 25 is secured as by means of rivets or the like 26 to the laterally-extending seat-supporting portions 20. The front portion of the seat is also secured as by means of a rivet or the like 27 to the upper leg 11 of the frame member 10.

A decorative panel 28, which may contain the name of the toy vehicle or other indicia, is secured by rivets 29 between the members 17 of the rear frame member 16.

The reference character 35 indicates the steering column or steering rod of the vehicle. This steering-rod, which may be formed of a metal rod, is rotatably mounted in aligned apertures 36 formed in the legs 11 and 12 of the main frame member 10. This provides a simple means for mounting the steering rod, and the spaced supports thus provided for the steering rod result in a simple but sturdy construction.

The reference character 37 indicates steering means in the form of a pair of handle bars provided with a sleeve 38 extending perpendicularly thereto. The sleeve 38 is adapted to telescopically engage the upper end of the steering rod 35 and to be detachably secured thereto by means of a nut and bolt, or the like 39.

The lower end of the steering rod 35 is provided with a laterally-bent portion 40 forming a shoulder 41 which, in one position of the parts, is engaged by the lower leg 12 of the frame member 10 to provide a support for the frame member. The lower extremity of the steering rod 35 is bent at a substantially right angle to the axis of the steering rod to form an axle 42 upon which the front wheel 43 is rotatably mounted.

An important feature of this invention is the means for varying the height of the frame member with respect to the front wheel 43, and hence the height of the seat 25. This is accomplished in a simple but effective manner by employing a spacer-sleeve 50 which is adapted to be selectively positioned on the steering rod 35, either between the upper leg 11 of the frame member 10 and the sleeve 38 of the steering means 37, as shown in FIGURE 2; or, between the lower leg 12 of the frame member 10 and the shoulder 41 on the steering rod 35, as shown in FIGURE 5. When the spacer-sleeve 50 is positioned as shown in FIGURE 2, it substantially fills the space between the end of the sleeve 38 and the upper leg 11 of the main frame member 10 to prevent vertical play between the frame member 10 and the steering column. In this position of the parts, the lower leg 12 of the main frame member 10 rests upon the shoulder 41 formed on the steering rod 35 and is supported thereby. With the parts thus assembled, the seat 25 is in its lower position.

When it is desired to raise the seat 25, the handle bars 37 are removed by disconnecting the fastening means 39, whereupon the spacer-sleeve 50 may be removed from the steering rod and the steering rod may be removed from the main frame member 10. Thereupon, the spacer-sleeve 50 is telescoped onto the steering rod 35 until it engages the shoulder 41, whereupon the steering rod 35 is again engaged with the main frame member and the handle bars are attached to the upper end thereof by the fastening means 39. This is the position of the parts illustrated in FIGURE 5. In this position, the frame 10 is supported through the spacer-sleeve 50 on the shoulder 41 and is in a raised position with respect to the front wheel 43 so that the seat 25 is correspondingly raised.

From the foregoing, it will be apparent that the invention provides a simplified construction which may be economically manufactured from a minimum number of parts of simple design, and which may be assembled with facility.

While a commercially practical embodiment of the invention has been described and illustrated herein somewhat in detail, it will be understood that various changes may be made as may come within the purview of the accompanying claims.

What is claimed is:

1. A wheeled toy vehicle comprising, a substantially U-shaped frame member, said frame member being provided with aligned apertures in the legs thereof, a steering rod rotatively mounted in said aligned apertures, steering means having a member adapted to engage the upper end of said steering rod, means for detachably securing said member to said steering rod to operatively connect said steering means thereto, the steering rod being provided, adjacent its lower end, with a laterally bent portion forming a shoulder engageable by the frame member to support the latter, an axle portion secured to the lower end of said steering rod, a spacer-sleeve on said steering rod selectively positioned between the steering means member and the frame member and between said steering rod shoulder and the frame member, to vary the position of the frame member with respect to the steering rod and thereby vary the height of the seat, and a wheel rotatably mounted on said axle portion.

2. In a vehicle of the class described, a substantially U-shaped frame member formed from a length of tubing, said frame member being provided with aligned apertures in the legs thereof adjacent the bight end thereof, a steering rod rotatively mounted in said aligned apertures, steering means having a sleeve portion adapted to engage the upper end of said steering rod, means for detachably securing said sleeve portion to said steering rod to operatively connect said steering means thereto, said steering rod being provided, adjacent its lower end, with a bent portion forming a shoulder engageable by the frame member to support the latter, the end of said steering rod being shaped to form an axle, a sleeve-like spacer member on said steering rod selectively positioned between the steering means sleeve portion and the frame member and between the bent portion of the steering rod and the frame member, to vary the position of the frame member with respect to the steering rod and thereby vary the height of the seat, and a wheel rotatably mounted on said axle.

3. A wheeled toy vehicle comprising, a substantially U-shaped frame member formed from a length of tubing, a seat mounted on the upper leg of said frame member, said frame member being provided with aligned apertures in the legs thereof adjacent the bight end thereof, a steering rod rotatively mounted in said aligned apertures, a pair of handle bars having a sleeve member adapted to telescopically engage the upper end of said steering rod, means for detachably securing said sleeve member to said steering rod to operatively connect said handle bars thereto, the steering rod being provided, adjacent its lower end, with a laterally bent portion forming a shoulder engageable by the frame member to support the latter, the end of said steering rod being bent at a substantially right angle to form an axle, a spacer-sleeve on said steering rod selectively positioned between the handle bar sleeve and the frame member and between said steering rod shoulder and the frame member, to vary the position of the frame member with respect to the steering rod and thereby vary the height of the seat, and a wheel rotatably mounted on said axle.

References Cited in the file of this patent

UNITED STATES PATENTS

| | | |
|---|---|---|
| D. 163,065 | Powell | Apr. 24, 1951 |
| 1,364,686 | Behm | Jan. 4, 1921 |
| 1,514,243 | Ziemss | Nov. 4, 1924 |
| 2,311,424 | Weller | Feb. 16, 1943 |
| 2,424,632 | Powlick | July 29, 1947 |
| 2,698,187 | Biro et al. | Dec. 28, 1954 |